US007062115B1

(12) United States Patent
Anderson et al.

(10) Patent No.: US 7,062,115 B1
(45) Date of Patent: Jun. 13, 2006

(54) ENHANCED PHOTONICS SENSOR ARRAY

(75) Inventors: William Walter Anderson, Half Moon Bay, CA (US); William Sven Barquist, Jr., Lakeport, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 125 days.

(21) Appl. No.: 10/924,901

(22) Filed: Aug. 25, 2004

(51) Int. Cl.
G02F 1/035 (2006.01)
G02B 6/00 (2006.01)
G02B 6/12 (2006.01)
G01B 9/02 (2006.01)

(52) U.S. Cl. .............................. 385/14; 385/2; 385/12; 356/477

(58) Field of Classification Search .................... 385/2, 385/12, 14; 356/477
See application file for complete search history.

(56) References Cited

U.S. PATENT DOCUMENTS

| 6,252,557 | B1 * | 6/2001 | Plugge et al. ................ 343/772 |
| 6,415,083 | B1 | 7/2002 | Anderson et al. |
| 6,703,596 | B1 | 3/2004 | Moran |
| 2002/0153906 | A1 | 10/2002 | Girton et al. |
| 2003/0001791 | A1 | 1/2003 | Barquist et al. |
| 2003/0193705 | A1 | 10/2003 | Anderson et al. |

OTHER PUBLICATIONS

U.S. Appl. No. 10/051,122, filed Dec. 4, 2003, Bell, et al.
H. G. Bukkems, et al., "Minimization of the Loss of Intersecting Waveguides in InP-Based Photonic Integrated Circuits", IEEE Photonics Technology Letters, Nov. 1999, pp. 1420-1422, vol. 11, No. 11.

Michael G. Daly, "Crosstalk Reduction in Intersecting Rib Waveguides", Journal of Lightwave Technology, Jul. 1996, pp. 1695-1698, vol. 14, No. 7.
D. G. Girton, et al. "Electrooptic Plymer Mach-Zehnder Modulators", Polymers for Second-Order Nonlinear Optics, ACS Symposium Series Aug. 21-25, 1994, pp. 456-468, chapter 33.
A. Himeno, et al., "High-Silica Single-Mode Optical Reflection Bending and Intersecting Waveguides", Electronics Letters, Oct. 24, 1985, pp. 1020-1021, vol. 21, No. 22.
K. Aretz, et al., "Reduction of Crosstalk and Losses of Intersecting Waveguide", Electronics Letters, May 25, 1989, pp. 730-731, vol. 25, No. 11.

* cited by examiner

Primary Examiner—Frank G. Font
Assistant Examiner—Michael P. Mooney
(74) Attorney, Agent, or Firm—McDermott Will & Emery

(57) ABSTRACT

A photonics sensor including first and second electro-optically active optical waveguides, being substantially parallel. The photonics sensor also includes third and fourth electro-optically active optical waveguides coplanar with the first and second waveguides, the third and fourth waveguides being substantially parallel and intersecting the first and second waveguides at a 90 degree angle. The photonics sensor further includes first, second, third and fourth coplanar and adjacent planar electrodes substantially parallel to the first and second waveguides, the planar electrodes arranged so that an incident electromagnetic signal will impinge upon the planar electrodes. The photonics sensor also includes first, second, third and fourth coupling strips substantially parallel to the planar electrodes, and disposed such that the waveguides lie between the coupling strips and the planar electrodes. Optical signals in the first, second, third and/or fourth waveguides are modulated by a varying voltage potential induced between the planar electrodes and the coupling strips by the incident electromagnetic signal.

7 Claims, 8 Drawing Sheets

ENHANCED PHOTONICS SENSOR ARRAY

STATEMENT AS TO RIGHTS TO INVENTIONS MADE UNDER FEDERALLY SPONSORED RESEARCH OR DEVELOPMENT

Not Applicable

FIELD OF THE INVENTION

The present invention relates generally to a dual polarization enhancement to a photonics sensor array, and more particularly relates to a photonics sensor array for the wideband reception and processing of electromagnetic signals.

BACKGROUND OF THE INVENTION

Conventional array antennas for the reception and transmission of electromagnetic signals are well known in the art. U.S. Pat. No. 6,252,557 ("Plugge"), for example, describes one known photonics sensor and array for the reception and processing of RF signals. As depicted in FIG. 1, Plugge is generally seen to describe sensor 100 which includes a plurality of sensor elements 101, 102 and 103, where sensor elements 101 and 102 are positioned above and sensor element 103 is positioned below plurality of parallel arms 104 and 105 of a Mach-Zehnder modulator.

Electromagnetic wavefront 106 impinging on sensor element 101 effectuates the generation of a voltage across sensor elements 101 and 103, stimulating arm 104 which lies there between. Electromagnetic wavefront 106 impinging on sensor element 102 effectuates the generation of a voltage across sensor elements 102 and 103, stimulating arm 105 which lies there between. Voltage across arm 105 is in the opposite polarity to the voltage across arm 104. Output fiber 107 emanating from arms 104 and 105 recovers the modulated signal, and the signal is recovered and processed according to known methods.

Conventional photonics sensors, such as the photonics sensor described in Plugge, are only seen to be sensitive to incident electromagnetic fields with a component of the incident electric field orthogonal to the arms of an underlying Mach-Zehnder modulator structure. Accordingly, it is therefore considered highly desirable to overcome the deficiencies of conventional photonics sensors, to provide an enhanced photonics array which detects all polarizations of an incident electromagnetic field.

SUMMARY OF THE INVENTION

The present invention relates generally to a dual polarization enhancement to a photonics sensor array, and more particularly relates to a photonics sensor array for the wideband reception and processing of electromagnetic signals.

According to one aspect, the present invention is a photonics sensor including first and second electro-optically active optical waveguides, being substantially parallel. The photonics sensor also includes third and fourth electro-optically active optical waveguides coplanar with the first and second waveguides, the third and fourth waveguides being substantially parallel and intersecting the first and second waveguides at a 90 degree angle. The photonics sensor further includes first, second, third and fourth coplanar and adjacent planar electrodes substantially parallel to the first and second waveguides, the planar electrodes arranged so that an incident electromagnetic signal will impinge upon the planar electrodes. The photonics sensor also includes first, second, third and fourth coupling strips substantially parallel to the planar electrodes, and disposed such that the waveguides lie between the coupling strips and the planar electrodes. Optical signals in the first, second, third and/or fourth waveguides are modulated by a varying voltage potential induced between the planar electrodes and the coupling strips by the incident electromagnetic signal.

The first waveguide lies between the first planar electrode and the first coupling strip and between the second planar electrode and the second coupling strip. The second waveguide lies between the fourth planar electrode and the first coupling strip and between the third planar electrode and the second coupling strip. The third waveguide lies between the second planar electrode and the third coupling strip and between the third planar electrode and the fourth coupling strip. The fourth waveguide lies between the first planar electrode and the third coupling strip and between the fourth planar electrode and the fourth coupling strip.

The photonics sensor also includes a first optical source coupled to a first end of each of the first and second waveguides, and a second optical source coupled to a first end of each of the third and fourth waveguides.

The photonics sensor further includes a first output optical waveguide coupled to a second end of each of the first and second waveguides, obverse to the first end, and a second output optical waveguide coupled to a second end of each of the third and fourth waveguides, obverse to the first end.

The photonics sensor includes a first photodetector coupled to the first output optical waveguide, and a second photodetector coupled to the second output optical waveguide. The photonics sensor includes a coupler electrically connecting the second and fourth electrodes to the coupling strip, where the second and fourth electrodes and the coupling strip are kept at a substantially same electrical potential.

The photonics sensor includes a first bias circuit connected to one of the planar electrodes and one of the coupling strips such as to bias the first or second waveguides to a quadrature or other operating point. The photonics sensor also includes a second bias circuit connected to one of the planar electrodes and one of the coupling strips such as to bias the third or fourth waveguides to a quadrature or other operating point.

According to the present invention, photocurrents $i_x$ and $i_y$ are determined as shown below in Equation (1) and Equation (2):

$$i_x = \sqrt{377 S_i} \, A_R \eta_{opt} P_{opt} \frac{\pi n^3 r_{33} W}{\lambda_{opt}} \frac{S}{h} \frac{1}{\sqrt{1 + \left(\frac{377 \pi f \varepsilon_r \varepsilon_o w S}{h}\right)^2}} \left(\frac{\sin\left(\frac{n\pi W f}{c}\right)}{\frac{n\pi W f}{c}}\right) \sin\theta \quad \text{Equation (1)}$$

$$i_y = \sqrt{377 S_i}\, A_R \eta_{opt} P_{opt} \frac{\pi n^3 r_{33} S}{\lambda_{opt}} \frac{W}{h} \frac{1}{\sqrt{1+\left(\frac{377\pi f \varepsilon_r \varepsilon_o wW}{h}\right)^2}} \left(\frac{\sin\left(\frac{n\pi Sf}{c}\right)}{\frac{n\pi Sf}{c}}\right) \cos\theta \qquad \text{Equation (2)}$$

In Equation (1) and Equation (2), $S_i$ represents incident electromagnetic field power density, $A_R$ represents photodetector responsivity, $\eta_{opt}$ represents optical transmission loss, $P_{opt}$ represents optical power delivered by an optical source, n represents an index of refraction of dielectric layers, $r_{33}$ represents an electro-optic coefficient for Mach-Zehnder waveguides, $\lambda_{opt}$ represents optical source wavelength, S represents an electrode dimension in a y-direction, W represents an electrode dimension in an x-direction, h represents total thickness of dielectric layers, f represents incident electromagnetic field frequency, $\epsilon_r$ represents a relative dielectric constant of dielectric layers, $\epsilon_0$ represents permittivity of a vacuum, w represents an overlap of the first planar electrode and the coupling strip, and c is a constant representing speed of light in a vacuum.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

Figure 1:
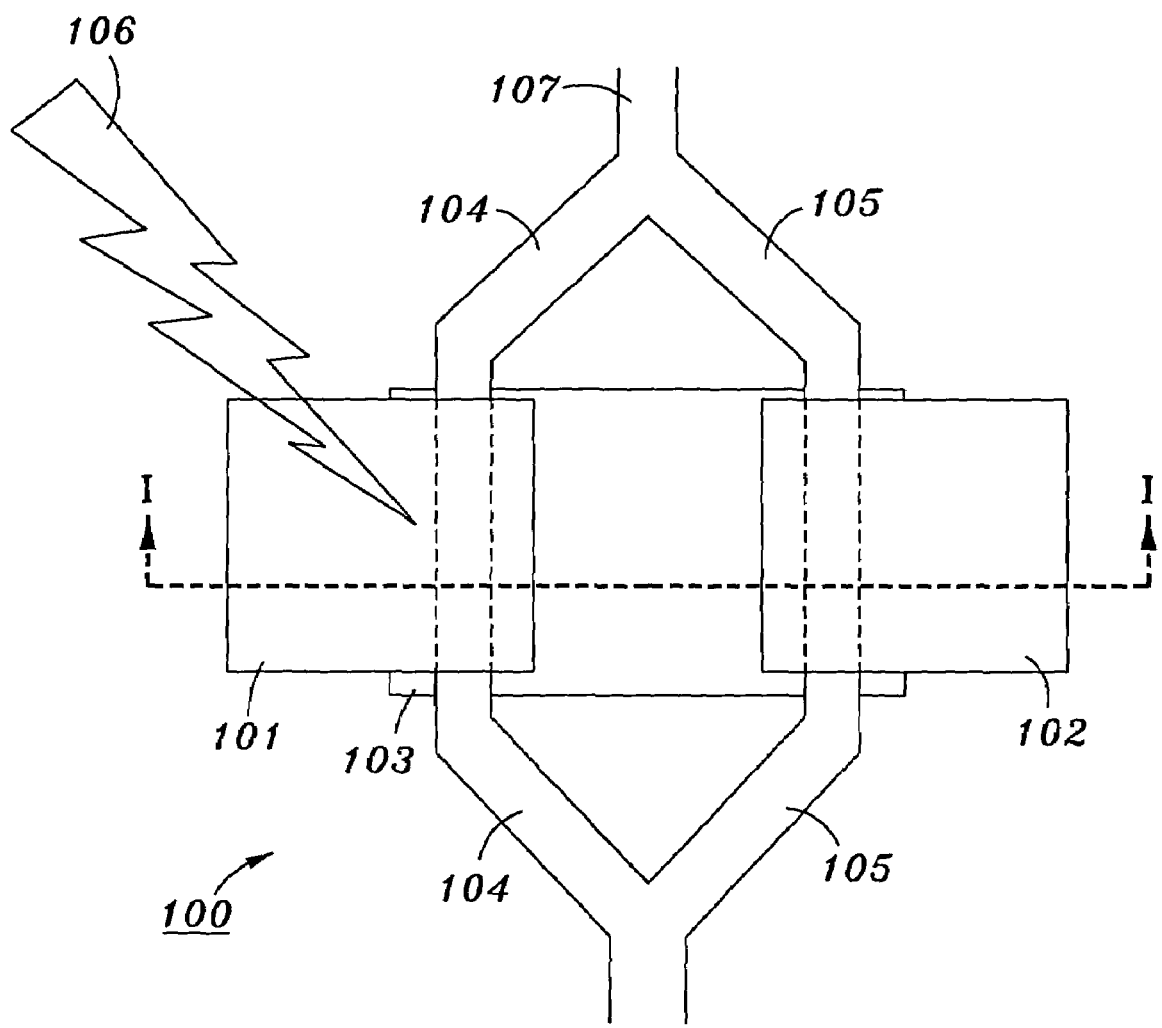
FIG. 1 depicts one example of a conventional photonics sensor, as described in Plugge.

The present invention provides for an enhanced photonics array which detects all polarizations of an incident electromagnetic field. The enhanced photonics array improves upon conventional antenna arrays, including the conventional photonics sensor depicted in FIG. 1, which are only seen to be sensitive to incident electromagnetic fields with a component of the incident electric field orthogonal to the arms of an underlying Mach-Zehnder modulator structure.

Figure 2:
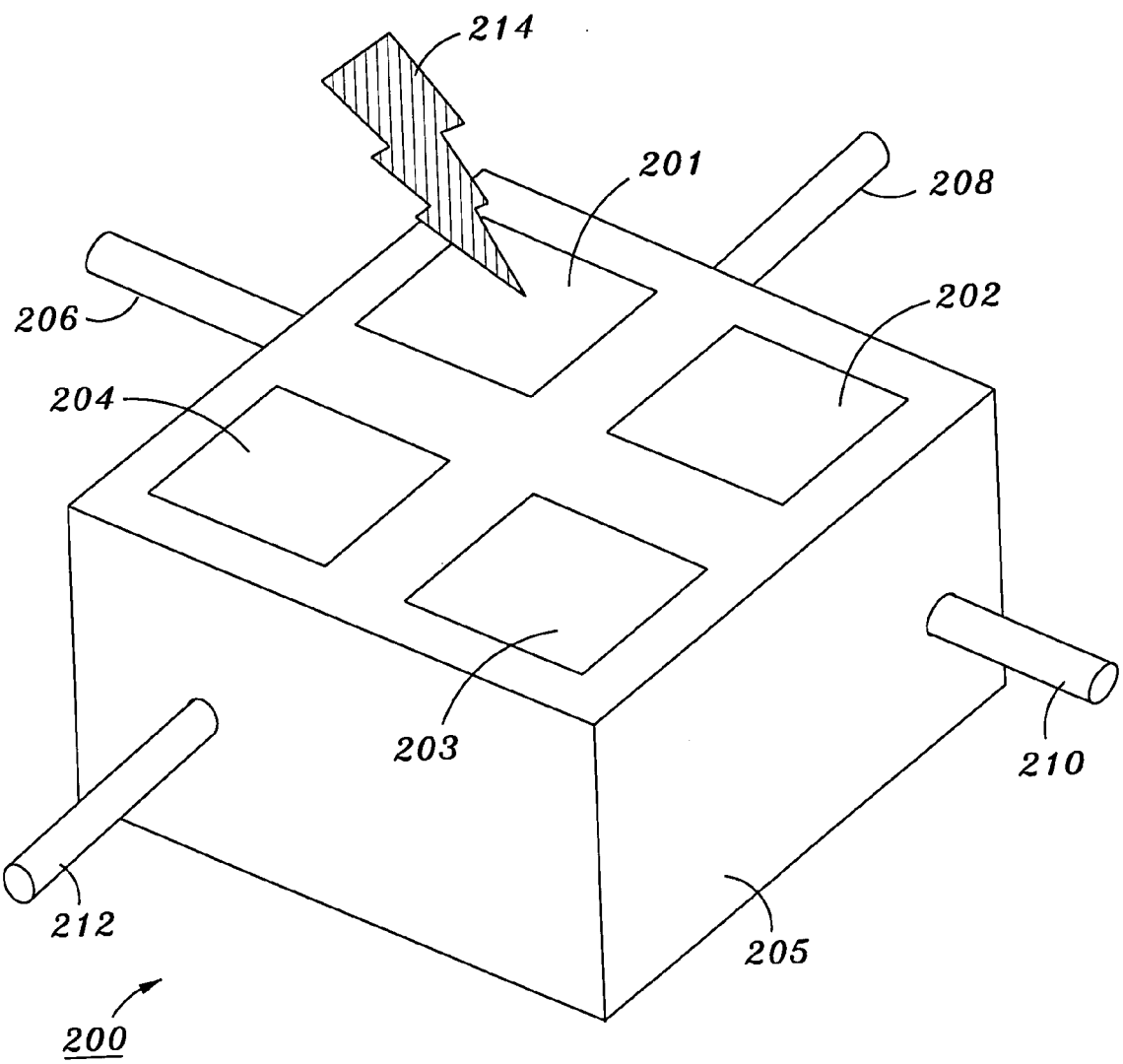
FIG. 2 depicts the external appearance of the enhanced photonics sensor according to one embodiment of the present invention.

FIG. 2 depicts the external appearance of the enhanced photonics sensor according to one embodiment of the present invention. Specifically, photonics sensor 200 includes a plurality of planar electrodes including planar electrodes 201 to 204, dielectric support 205, input optical fibers 206 and 208, and output optical fibers 210 and 212. The plurality of planar electrodes are metallic strips which are deposited on a dielectric polymer sheet by metal evaporation or sputtering, where the shapes of the planar electrodes are determined by photolithography or etching.

Photonics sensor 200 further includes two orthogonal Mach-Zehnder modulators (not shown). Arms of the first Mach-Zehnder modulator are parallel to the the gap between pair of adjacent planar electrodes 201 and 202 and pair of adjacent planar electrodes 203 and 204. Arms of the second Mach-Zehnder modulator are parallel to the gap between pair of adjacent planar electrodes 202 and 203 and pair of adjacent planar electrodes 201 and 204. A plurality of coupling strips (not shown) are positioned underneath the orthogonal Mach-Zehnder modulators and, together with the plurality of planar electrodes, form a plurality of capacitors (not shown), where one arm of each modulator lies within two of the capacitors. Photonics sensor 200 can be arrayed in an array of N photonics sensors, resulting in an $N^2$-fold increase in detected power, an N-fold reduction in system noise figure, and an N-fold increase in array directivity.

Each Mach-Zehnder modulator is stimulated by an optical source, such as a laser, via input optical fibers 206 and 208. Electromagnetic wavefront 214 impinging on planar electrodes 201 through 204 generates a field across the photonics sensor which in turn sets up a voltage across each gap between adjacent photonics sensors, and between each photonics sensor and a corresponding coupling strip. This voltage modulates the optical drive signal provided by input optical fibers 206 and 208. Output optical fibers 210 and 212 are fed to a photodiode or the like (not illustrated), where the signal may be recovered according to conventional methods.

Figure 3:
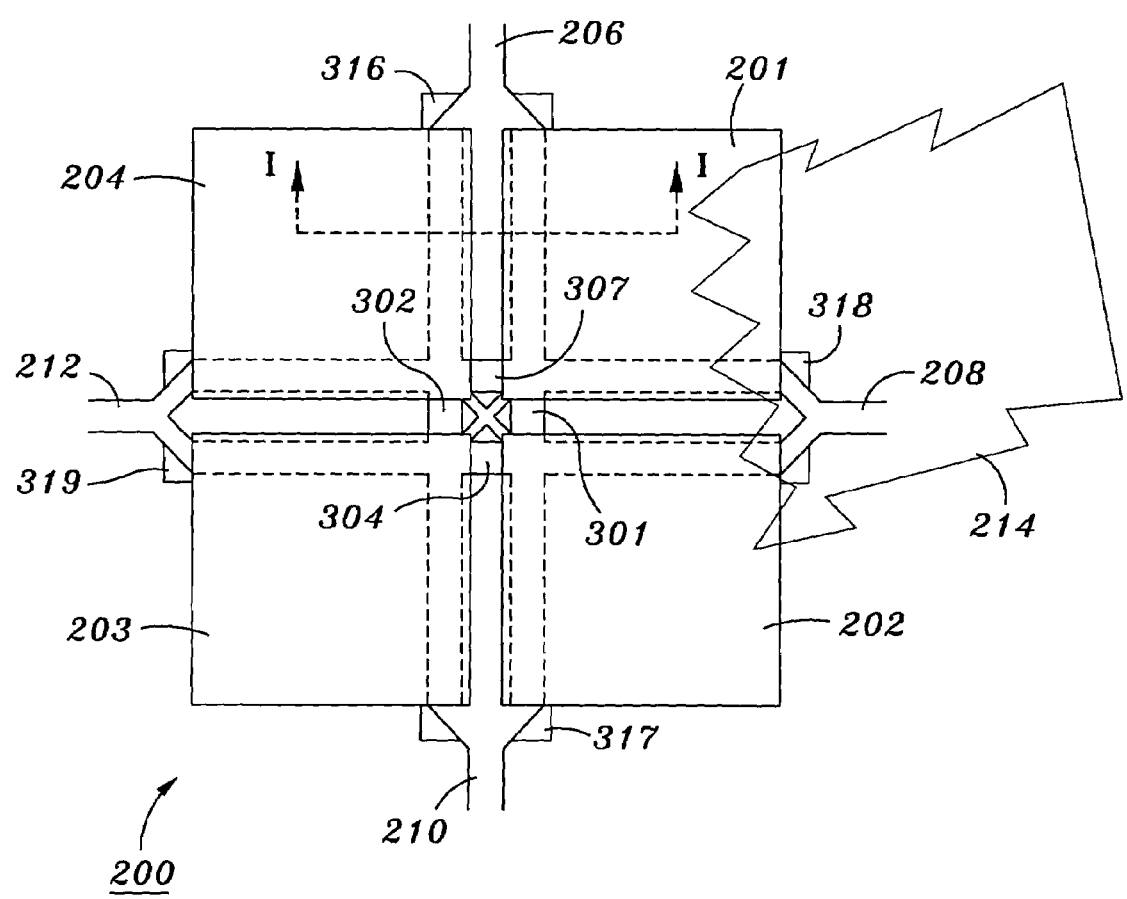
FIG. 3 illustrates a frontal view of an a single photonics sensor according to one embodiment of the present invention.

FIG. 3 illustrates a frontal view of an a single photonics sensor according to one embodiment of the present invention. Briefly, the photonics sensor includes first and second electro-optically active optical waveguides, being substantially parallel. The photonics sensor also includes third and fourth electro-optically active optical waveguides coplanar with the first and second waveguides, the third and fourth waveguides being substantially parallel and intersecting the first and second waveguides at a 90 degree angle. The photonics sensor further includes first, second, third and fourth co-planar and adjacent planar electrodes substantially parallel to the first and second waveguides, the planar electrodes arranged so that an incident electromagnetic signal will impinge upon the planar electrodes. The photonics sensor also includes first, second, third and fourth coupling strips substantially parallel to the planar electrodes, and disposed such that the waveguides lie between the coupling strips and the planar electrodes. Optical signals in the first, second, third and/or fourth waveguides are modulated by a varying voltage potential induced between the planar electrodes and the coupling strips by the incident electromagnetic signal.

Specifically, photonics sensor 200 includes first electro-optically active optical waveguide 301 and second electro-optically active optical waveguide 302, being substantially parallel. Photonics sensor 200 also includes third electro-optically active optical waveguide 304 and fourth electro-optically active optical waveguide 307 coplanar with the first and second waveguides 301 and 302, third and fourth waveguides 304 and 307 being substantially parallel and intersecting first and second waveguides 301 and 302 at a 90 degree angle. Photonics sensor 200 further includes first, second, third and fourth co-planar and adjacent planar electrodes 201, 202, 203 and 204 substantially parallel to first and second waveguides 301 and 302, planar electrodes 201 to 204 arranged so that incident electromagnetic signal 214 will impinge upon the planar electrodes 201 to 204. Photonics sensor 200 also includes first coupling strip 316, second coupling strip 317, third coupling strip 318 and fourth coupling strip 319, coupling strips 316 to 319 being substantially parallel to planar electrodes 201 to 204, and disposed such that waveguides 301, 302, 304 and 307 lie between coupling strips 316 to 319 and planar electrodes 201 to 204. Optical signals in first waveguide 301, second waveguide 302, third waveguide 304 and/or fourth waveguide 307 are modulated by a varying voltage potential induced between planar electrodes 201 to 204 and coupling strips 316 to 319 by incident electromagnetic signal 214.

First waveguide 301 lies between first planar electrode 201 and first coupling strip 316 and between second planar electrode 202 and second coupling strip 317. Second waveguide 302 lies between fourth planar electrode 204 and first coupling strip 316 and between third planar electrode 203 and second coupling strip 317. Third waveguide 304 lies between second planar electrode 202 and third coupling strip 318 and between third planar electrode 203 and fourth coupling strip 319. Fourth waveguide 307 lies between first planar electrode 201 and third coupling strip 318 and between fourth planar electrode 204 and fourth coupling strip 319.

First waveguide 301 and second waveguide 302 comprise a first Mach-Zehnder modulator (or interferometer), and third waveguide 304 and fourth waveguide 307 comprise a second Mach-Zehnder modulator. A Mach-Zehnder interferometer is a simple device for demonstrating interference by splitting a light beam into two parts by a beamsplitter and then recombining the light beams using a second beamsplitter. Depending on the relative phase acquired by the beam along the two paths, the second beamsplitter will transmit the beam with efficiency between 0 and 100%. Used to induce optical interference, Mach-Zehnder interferometers are widely used for such telecom applications as optical switches and optical modulators.

Photonics sensor 200 further includes a first bias circuit (not shown) connected to one of the planar electrodes and one of the coupling strips such as to bias first or second waveguides 301 or 302 to a quadrature or other operating point. Photonics sensor 200 further includes a second bias circuit (not shown) connected to one of the planar electrodes and one of the coupling strips such as to bias third or fourth waveguides 304 or 307 to a quadrature or other operating point.

A DC bias can be applied to any of the coupling strips such as coupling strip 319 and one of the planar electrodes above the coupling strip such as planar electrode 203 to bias the second Mach-Zehnder consisting of electro optically active waveguides 304 and 307 at its quadrature point or any other point that is desired. Similarly, a DC bias can be applied to any of the coupling strips such as coupling strip 317 and one of the planar electrodes above the coupling strip such as planar electrode 202 to bias the first Mach-Zehnder consisting of electro optically active waveguides 301 and 302 at its quadrature point or any other point that is desired.

First waveguide 301 intersects third waveguide 304 at an angle of 90 degrees. The present invention utilizes the property of intersecting planar lightwave circuits in which there is negligible crosstalk for intersection angles greater than 30 degrees. For the sensing of orthogonal polarizations, the present invention uses two electro-optically active Mach-Zehnder modulators intersecting at right angles, and planar electrodes with gaps in the electrodes between the centerlines of the modulators.

While FIG. 2 shows a single enhanced dual polarization photonic sensor element, the individual elements may be arrayed and the individual photocurrents coherently added or digitally processed. Such arraying of N elements results in an $N^2$-fold increase in detected power, an N-fold reduction in system noise figure, and an N-fold increase in array directivity. Individual elements may be arrayed on an arbitrarily contoured surface or the elements may be fabricated on a flexible substrate which is then made conformable to an arbitrarily contoured surface. Individual elements of varying surface dimensions may be fabricated and arrayed to form a common aperture array spanning many octaves or decades of a given frequency.

Figure 4A:
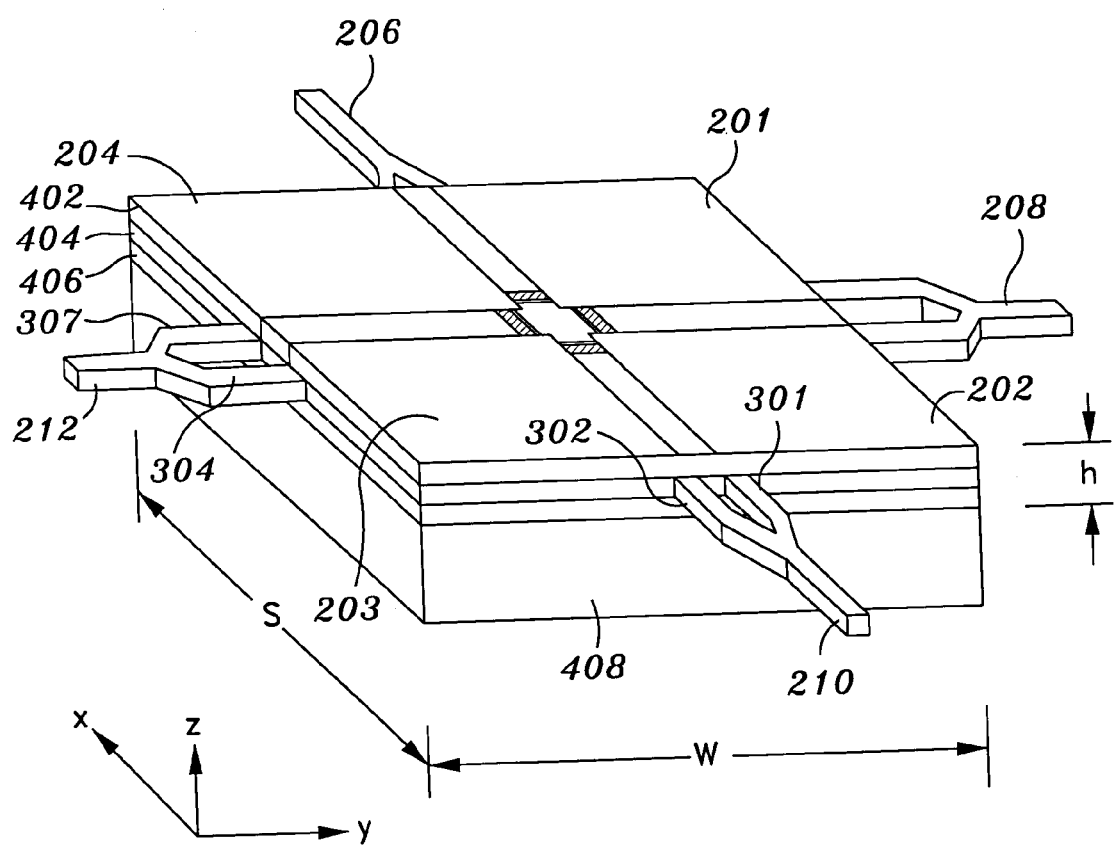
FIGS. 4A and 4B are perspective views of the FIG. 3 photonics sensor.
Figure 4B:
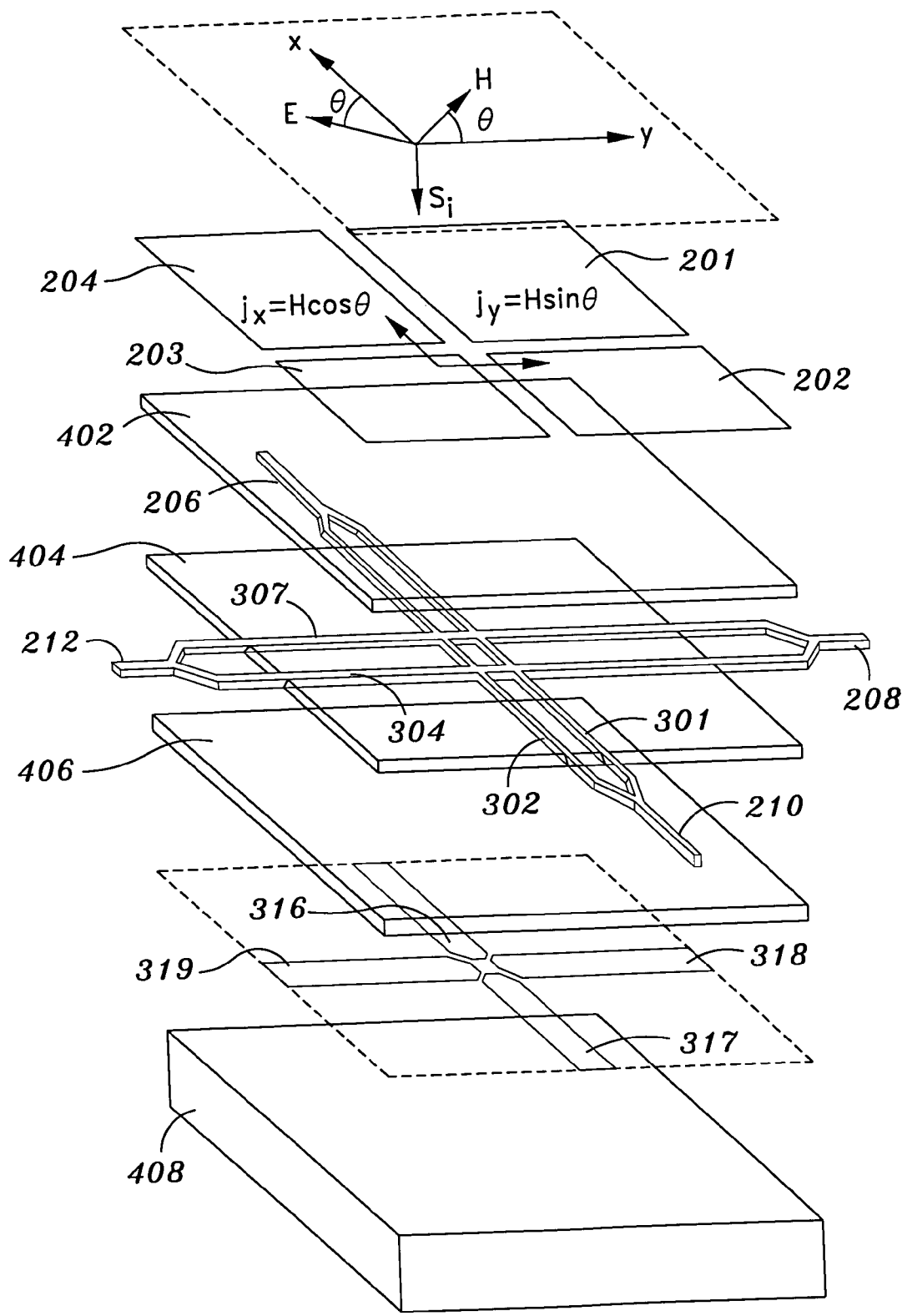

The operation and fabrication of the photonics sensor according to the present invention is illustrated in FIGS. 4A and 4B, which are perspective views of the FIG. 3 embodiment. Specifically, an incident electromagnetic field with Poynting vector, $S_i$, normal to the top electrode induces a surface current in the top metal electrode structure, comprised of first through fourth planar electrodes. Poynting vector $S_i$ represents the cross product of an electric field and a magnetic field, pointing in the direction of energy flow of a propagating electromagnetic wave. In FIGS. 4A and 4B, the x-axis is defined by the first Mach-Zehnder modulator, which is parallel to first waveguide 301 and second waveguide 302. The y-axis is defined by the second Mach-Zehnder modulator which is normal to the first Mach-Zehnder modulator and parallel to third waveguide 304 and fourth waveguide 307.

If the H-component of the incident field is at an angle θ with respect to the y-axis as shown, then the induced surface current may be resolved into components $j_x$ flowing in the x-direction and $j_y$ flowing in the y-direction. Current continuity across the gaps between the plurality of planar electrodes is accomplished by the displacement current through the dielectric layers of top cladding 402, core cladding 404 and bottom cladding 406 to coupling strips 316 to 319. The displacement current travels through coupling strips 316 to 319 mounted above substrate 408, and back up through the three dielectric layers to the plurality of planar electrodes.

The electric field intensity associated with the displacement current through the electro-optically active waveguides of the Mach-Zehnder modulators induces the optical phase modulation through the linear electro-optic effect, effectuating intensity modulation at the exit port of each modulator.

Figure 5:
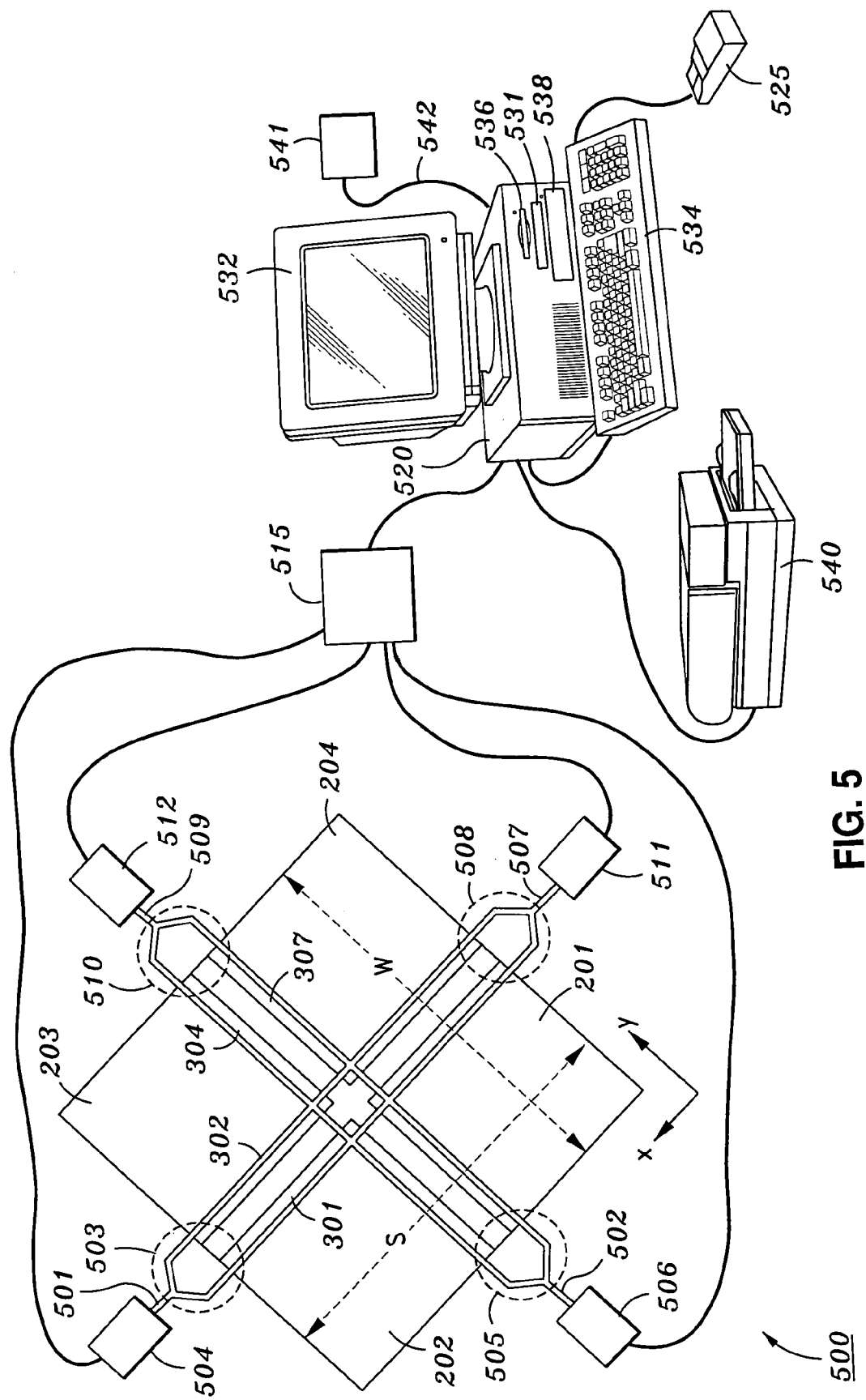
FIG. 5 is a depiction of an additional embodiment of the enhanced photonics sensor, including optical sources, photodetectors, and a controller.

FIG. 5 depicts an additional embodiment of the enhanced photonics sensor, including optical sources, photodetectors, and a controller. In the FIG. 5 embodiment, photonics sensor 500 includes first optical input channel 501 at first end 503 of first and second waveguides 301 and 302, which receives the optical drive signal provided by first optical source 504. Photonics sensor 500 also includes second optical input channel 502 at first end 505 of third and fourth waveguides 304 and 307, which receives the optical drive signal provided by second optical source 506.

Photonics sensor 500 also includes first output optical waveguide 506 coupled to second end 507 of first waveguide 301 and second waveguide 302, obverse to first end 502, and second output optical waveguide 509 coupled to second end 510 of third waveguide 304 and fourth waveguide 307, obverse to first end 505. Photonics sensor 500 also includes first photodetector 511 coupled to first output optical waveguide 507, and second photodetector 512 coupled to second output optical waveguide 509.

Photonics sensor 500 may include a bias circuit (not shown) electrically connecting a planar electrode to a coupling strip. By way of example, coupling strip 316 may be electrically connected to planar electrode 203 through a bias circuit to establish a quadrature or other bias point on Mach-Zehnder arm 304 and coupling strip 317 may be electrically connected to planer electrode 202 through a bias circuit to establish a quadrature or other bias point on Mach-Zehnder arm 301. The bias circuits will not interact with the RF induced currents in the sensor structure.

The RF field that impinges on first planar electrode 201 induces a varying voltage potential between first planar electrode 201 and coupling strip 319. That voltage advances or retards the optical signal in intervening first waveguide 301. The RF field that impinges on first planar electrode 201 also induces a varying voltage potential between first planar electrode 201 and coupling strip 318. That voltage advances or retards the optical signal in intervening fourth waveguide 307.

The RF field that impinges on planar electrode 202 induces a varying voltage potential between planar electrode 202 and coupling strip 318. That voltage advances or retards the optical signal in intervening third waveguide 304. The RF field that impinges on planar electrode 202 also induces a varying voltage potential between planar electrode 202 and coupling strip 317. That voltage advances or retards the optical signal in intervening first waveguide 301.

The RF field that impinges on planar electrode 203 induces a varying voltage potential between planar electrode 203 and coupling strip 317. That voltage advances or retards the optical signal in intervening first waveguide 301. The RF field that impinges planar electrode 203 also induces a varying voltage potential between first electrode 203 and coupling strip 316. That voltage advances or retards the optical signal in intervening third waveguide 304.

The RF field that impinges on planar electrode 204 induces a varying voltage potential between first planar electrode 204 and coupling strip 319. That voltage advances or retards the optical signal in intervening fourth waveguide 307. The RF field that impinges on planar electrode 204 also induces a varying voltage potential between first electrode 204 and coupling strip 316. That voltage advances or retards the optical signal in intervening second waveguide 302. The optical signals exit the dual Mach-Zehnder modulators and are combined, producing two modulated optical output signals.

First optical source 504 and second optical source 506 supply an optical power, $P_{opt}$, to their respective Mach-Zehnder modulators and detectors of responsivity, producing a photocurrent proportional to the optical power on each detector. Electrical signals are sent from controller 515 and computer 520 to first and second optical sources 504 and 504 to control the intensity of $P_{opt}$, and signals representing detector responsivity are received at controller 515 and computer 520 from first and second photodetectors 511 and 512.

Photocurrents $i_x$ and $i_y$ are calculated by computer 520 as shown in Equations (1) and (2), where the x-axis is defined by the first Mach-Zehnder modulator, which is parallel to first waveguide 301 and second waveguide 302, and the y-axis is defined by the second Mach-Zehnder modulator, which is normal to the first Mach-Zehnder modulator and parallel to third waveguide 304 and fourth waveguide 307:

$$i_x = \sqrt{377 S_i}\, A_R \eta_{opt} P_{opt} \frac{\pi n^3 r_{33} W}{\lambda_{opt}} \frac{S}{h} \frac{1}{\sqrt{1+\left(\frac{377\pi f \varepsilon_r \varepsilon_o wS}{h}\right)^2}} \left(\frac{\sin\left(\frac{n\pi Wf}{c}\right)}{\frac{n\pi Wf}{c}}\right) \sin\theta \quad \text{Equation (1)}$$

$$i_y = \sqrt{377 S_i}\, A_R \eta_{opt} P_{opt} \frac{\pi n^3 r_{33} S}{\lambda_{opt}} \frac{W}{h} \frac{1}{\sqrt{1+\left(\frac{377\pi f \varepsilon_r \varepsilon_o wW}{h}\right)^2}} \left(\frac{\sin\left(\frac{n\pi Sf}{c}\right)}{\frac{n\pi Sf}{c}}\right) \cos\theta \quad \text{Equation (2)}$$

The parameters for calculating photocurrents $i_x$ and $i_y$ using a photonic electromagnetic field sensor are described in Table 1, below.

TABLE 1

Parameters Of Photonic Electromagnetic Field Sensor

| Symbol | Definition | Units |
|---|---|---|
| $S_i$ | Incident electromagnetic field power intensity | watts/meter² |
| $A_B$ | Photodetector responsivity | amps/watt |
| $\eta_{opt}$ | Optical transmission loss | |
| $P_{opt}$ | Optical power delivered by optical sources | watts |
| n | Index of refraction of dielectric layers | |
| $r_{33}$ | Electro-optic coefficient of Mach-Zehnder waveguides | meters/volt |
| $\lambda_{opt}$ | Laser optical wavelength | meters |
| S | Planar electrode dimension in y-direction | meters |
| W | Planar electrode dimension in x-direction | meters |
| h | Total thickness of dielectric layers | meters |
| f | Incident electromagnetic field frequency | hertz |
| $\varepsilon_r$ | Relative dielectric constant of dielectric layers | |
| $\varepsilon_o$ | Permittivity of vacuum | farads/meter |
| w | Overlap of planar electrode and coupling strip | meters |
| c | Speed of light in vacuum | meters/second |

From Equations (1) and (2) it can be seen that both polarizations of the incident field are detected. In addition, the varying temporal phase of the two polarizations are detected in the case of circular polarization.

Since the polarization of an incident electromagnetic field may not be predetermined at the sensor site, it is desirable to obtain sensitivity to an arbitrary incident polarization state. In addition, modern communication links may utilize both linear polarization states or utilize right and left circular polarization formats to enhance efficiency of information transport. Since the present invention is sensitive to all polarizations, the photonics sensor can extract information contained in the various polarizations.

Computer 520 is a local computing device such as a server, where computer 520 includes computer-readable storage medium, such as fixed disk drive 531, for controlling controller 515. As shown in FIG. 5, the hardware environment can include display monitor 532 for displaying text and images to a user, keyboard 534 for entering text data and user commands into computer 520, mouse 535 for pointing, selecting and manipulating objects displayed on display monitor 532, fixed disk drive 531, removable disk drive 536, tape drive 538, hardcopy output device 540, computer network 541, and computer network connection 542.

Computer 520 can be a desktop PC, a laptop, a workstation, a midrange computer, or a mainframe without departing from the scope of the present invention. Display monitor 532 displays the graphics, images, and texts that comprise the user interface for the application of the present invention as well as the operating system programs necessary to operate the computer. An operator of computer 520 uses keyboard 534 to enter commands and data to operate and control the computer operating system programs as well as the application programs. The operator uses mouse 535 to select and manipulate graphics and text objects displayed on display monitor 532 as part of the interaction with and control of computer 520 and applications running on the computer. Mouse 535 can be any type of pointing device, including a joystick, a trackball, or a touch-pad without departing from the scope of the present invention.

The software for computer 520 is stored locally on computer readable memory media such as fixed disk drive 531. Fixed disk drive 531 can comprise a number of physical drive units, such as a redundant array of independent disks ("RAID") without departing from the scope of the present invention. Fixed disk drive 531 can also be a disk drive farm or a disk array that can be physically located in a separate computing unit without departing from the scope of the present invention. Such computer readable memory media allow computer 520 to access information such as controller application data, computer-executable process steps, application programs and the like, stored on removable and non-removable memory media.

Network connection 542 can be a modem connection, a local-area network ("LAN") connection (such as an Ethernet connection), or a broadband wide-area network ("WAN") connection including a digital subscriber line ("DSL"), Cable, T1, T3, Fiber Optics, or Satellite connection, without departing from the scope of the present invention. Furthermore, network 541 can be a LAN network, a corporate WAN network, or the Internet without departing from the scope of the present invention.

Removable disk drive 536 is a removable storage device that can be used to off-load data from computer 520 or upload data onto computer 520. Without departing from the scope of the present invention, removable disk drive 536 can be a floppy disk drive, an Iomega® Zip® drive, a compact disk-read only memory ("CD-ROM") drive, a CD-Recordable drive (CD-R), a CD-Rewritable drive (CD-RW), a DVD-ROM drive, flash memory, a Universal Serial Bus (USB) flash drive, pen drive, key drive, or any one of the various recordable or rewritable digital versatile disk ("DVD") drives such as the DVD-R, DVD-RW, DVD-RAM, DVD+R, or DVD+RW. Operating system programs, applications, and various data files are stored on disks. The files can be stored on fixed disk drive 531 or on a removable media for removable disk drive 536 without departing from the scope of the present invention.

Tape drive 538 is a tape storage device that can be used to off-load data from computer 520 or upload data onto computer 520. Tape drive 538 can be quarter-inch cartridge ("QIC"), 4 mm digital audio tape ("DAT"), or 8 mm digital linear tape ("DLT") drive without departing from the scope of the present invention.

Hardcopy output device 540 provides an output function for the operating system programs and applications for controlling controller 515. Hardcopy output device 540 can be a printer or any output device that produces tangible output objects without departing from the scope of the present invention. While hardcopy output device 540 is shown as being directly connected to computer 520, it need not be. Hardcopy output device 540 may be connected via a network (e.g., wired or wireless network, not shown), for example.

Figure 6:
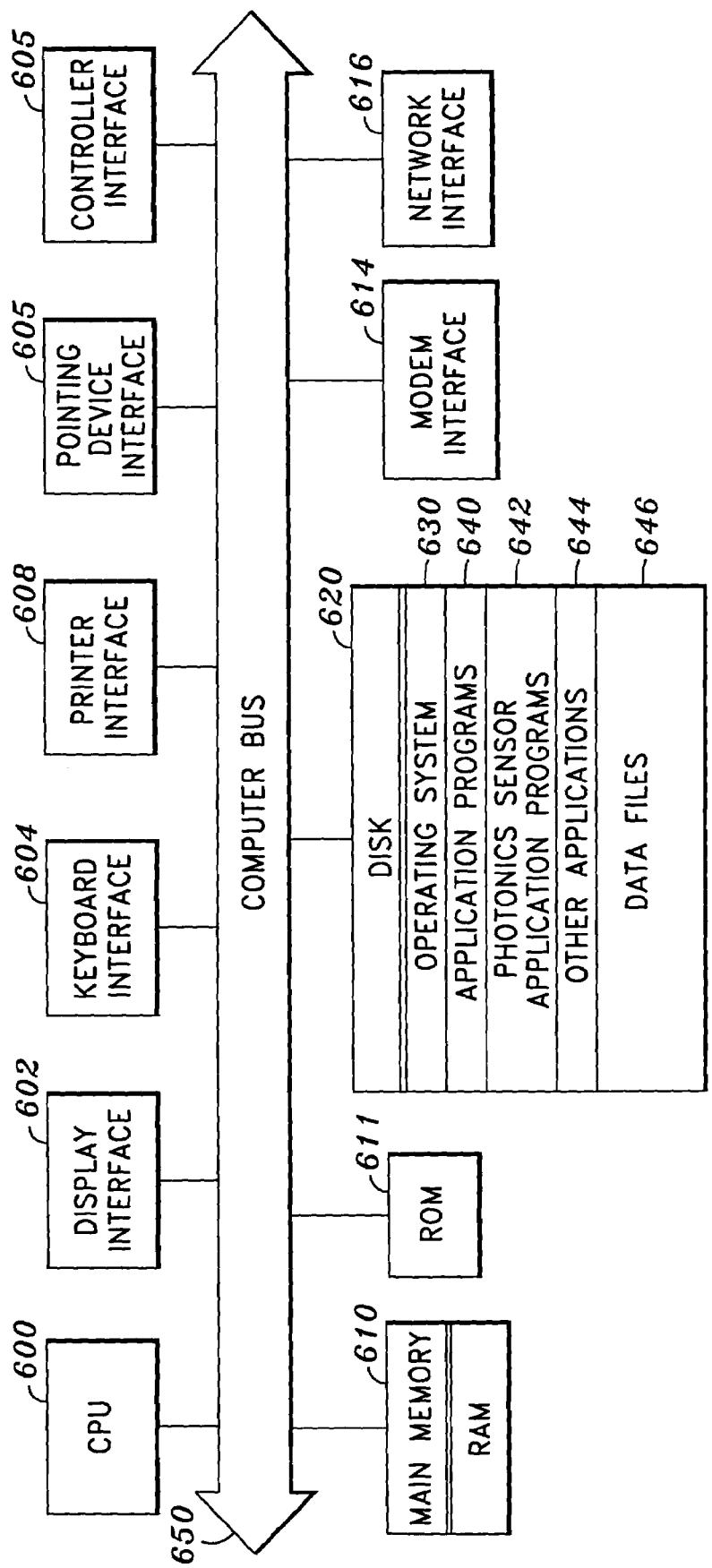
FIG. 6 is a detailed block diagram showing the internal architecture of the FIG. 5 embodiment.

FIG. 6 is a detailed block diagram showing the internal architecture of computer 520. As shown in FIG. 6, the computing environment can include: central processing unit ("CPU") 600 where the computer instructions that comprise an operating system or an application are processed; display interface 602 which provides communication interface and processing functions for rendering graphics, images, and texts on display monitor 532; keyboard interface 604 which provides a communication interface to keyboard 534; pointing device interface 605 which provides a communication interface to mouse 535 or an equivalent pointing device; controller interface 607 which provides a communication interface to controller 515; printer interface 609 which provides a communication interface to hardcopy output device 540; random access memory ("RAM") 610 where computer instructions and data can be stored in a volatile memory device for processing by CPU 600; read-only memory ("ROM") 611 where invariant low-level systems code or data for basic system functions such as basic input and output (I/O), startup, or reception of keystrokes from keyboard 534 are stored in a non-volatile memory device; disk 620 which can comprise fixed disk drive 531 and removable disk drive 536, where the files that comprise operating system 630, application programs 640 (including photonics sensor application programs 642 and other applications 644) and data files 646 are stored; modem interface 614 which provides a communication interface to computer network 541 over a modem connection; and computer network interface 616 which provides a communication interface to computer network 541 over computer network connection 542. The constituent devices and CPU 600 communicate with each other over computer bus 650.

RAM 610 interfaces with computer bus 650 so as to provide quick RAM storage to CPU 600 during execution of software programs, such as the operating system application programs and device drivers. More specifically, CPU 600 loads computer-executable process steps from fixed disk drive 531 or other memory media into a region of RAM 610 in order to execute software programs. Data, including data relating to the control of controller 515, can be stored in RAM 610, where the data can be accessed by CPU 600 during execution.

CPU 600 can be any of the high-performance CPUs, including an Intel CPU, a PowerPC CPU, a MIPS RISC CPU, a SPARC CPU, a Alpha CPU or a proprietary CPU for a mainframe, without departing from the scope of the present invention. CPU 600 in computer 520 can comprise more than one processing units, including a multiple CPU configuration found in high-performance workstations and server, or a multiple scalable processing units found in mainframes.

Operating system 630 can be: Windows NT/2000/XP Workstation; Windows NT/2000/XP Server; a variety of Unix-flavor operating systems, including AIX for IBM workstations and servers, SunOS for Sun workstations and servers, Linux for Intel CPU-based workstations and servers, HP-UX for HP workstations and servers, Irix for SGI workstations and servers, VAX/VMS for DEC computers, OpenVMS for Alpha-based computers, Mac OS X for PowerPC based workstations and servers, or a proprietary operating system for mainframe computers.

Although FIGS. 4 to 6 illustrate one example embodiment of an photonics sensor with a computer that executes program code, or program or process steps, other types of systems may also be used as well.

From Equations (1) and (2) it can be seen that both polarizations of the incident field are detected. In addition, the varying temporal phase of the two polarizations are detected in the case of circular polarization.

Since the polarization of an incident electromagnetic field may not be predetermined at the sensor site, it is desirable to obtain sensitivity to an arbitrary incident polarization state. In addition, modern communication links may utilize both linear polarization states or utilize right and left circular polarization formats to enhance efficiency of information transport. Since the present invention is sensitive to all polarizations, the photonics sensor can extract information contained in the various polarizations.

Figure 7:
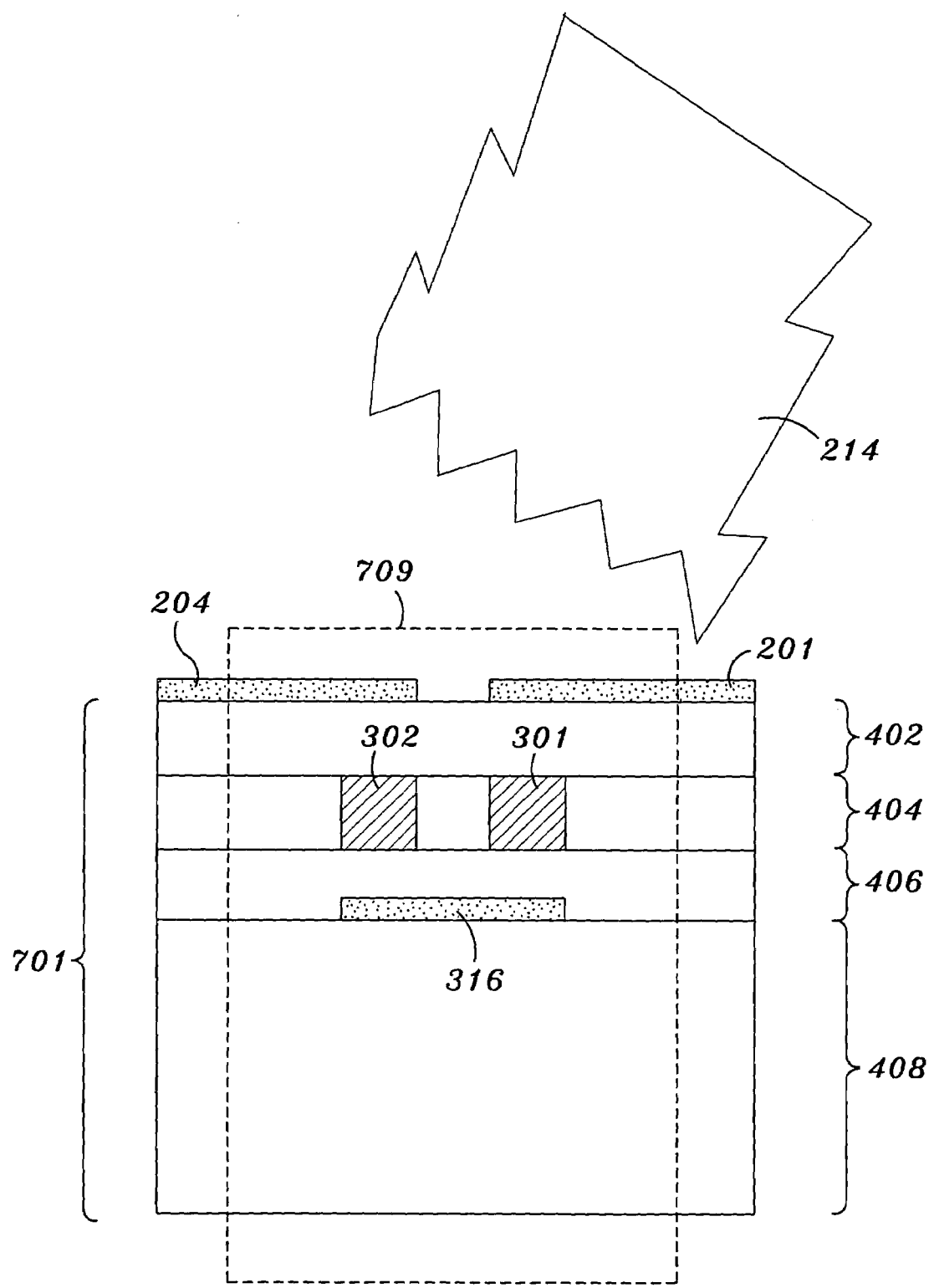
FIG. 7 is a cross-section of a portion of the FIG. 3 photonics sensor.

FIG. 7 is a cross-section of a portion of a portion 700 of one embodiment of photonics sensor 200, which corresponds to section I—I of FIG. 3. Portion 700 includes planar electrodes 201 and 204 which are mounted on body 701. Body 701 includes polymer layers, including top cladding 402, core cladding 404 and bottom cladding 406, where each of polymer layers is approximately 3 micrometers thick, and has a dielectric constant of 3.4. Within core cladding 404, optical waveguides 301, 302, 304 (not depicted) and 307 (not depicted) are formed. Bottom cladding 406 adjoins silicon substrate 408 having a thickness of 10–20 mils, an epsilon of 12, and a resistivity rho of greater than 10000 ohm-centimeters.

Although the construction has been described using polymer materials, any suitable electro-optic material may be used to form body 701. Furthermore, in one arrangement, planar electrodes 202 and 203 measure approximately 1 inch on each edge and are separated from each other by a gap measuring between 50 micrometers and 2 mils. Variations on these dimensions may be made to optimize or customize the performance or operation of the present invention.

Core cladding 404 includes a plurality of optical paths, including first waveguide 301 and second waveguide 302 which form the branches of a single Mach-Zehnder modulator 709. Between polymer layer 406 and silicon substrate 408 are the coupling strip 316 to 319 (317 to 319 are not depicted). In operation, the potential induced by electromagnetic signal 214 upon planar electrodes 201 and 204 with respect to coupling strip 316 modulates the optical signal on an intervening first waveguide 301 and second waveguide 302. In particular, the phase of the optical signal changes in accordance with the magnitude of the potential.

Referring to Mach-Zehnder modulator 709, when a differential potential exists between first planar electrode 201 and coupling strip 316, the optical signal traversing first optical waveguide 301 is modulated to have a different phase than second optical waveguide 302. When these optical signals are again joined, an interference pattern results and thus the optical signal becomes amplitude modulated. This amplitude modulated optical signal exits Mach-Zehnder modulator 709 along output fiber 210.

The device structure is preferably fabricated in thin film format. The four dimensional parameters, W, S, h and w, may be chosen to obtain the desired sensitivity and frequency response of a single sensor element. The substrate may be a solid such as crystalline silicon or other semiconductor, glass or polymer, where polymer substrate may be either rigid or flexible. The bottom metal electrode may be deposited by metal evaporation or sputtering, and the shape of the bottom electrode may be determined by photolithography and etching.

Bottom cladding 406 may be deposited by spin casting and curing to obtain a desired thickness, and the core layer and top cladding may be similarly deposited. The waveguide structure of the Mach-Zehnder modulators may be defined by (i) photolithographic definition of a mask and photobleaching of the core layer, (ii) photolithographic definition of a mask on the bottom cladding layer and trench etching prior to core layer deposition, or (iii) photolithographic definition of a mask on the core layer and rib etching prior to top cladding layer deposition. The top metal electrode may be deposited by metal evaporation or sputtering, and the shape of the top electrode may be determined by photolithography and etching.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A photonics sensor, comprising:
   first and second electro-optically active optical waveguides, being substantially parallel;
   third and fourth electro-optically active optical waveguides coplanar with said first and second waveguides, said third and fourth waveguides being substantially parallel and intersecting said first and second waveguides at a 90 degree angle;
   first, second, third and fourth co-planar and adjacent planar electrodes substantially parallel to said first and second waveguides, said planar electrodes arranged so that an incident electromagnetic signal will impinge upon said planar electrodes;
   first, second, third and fourth coupling strips substantially parallel to said planar electrodes, and disposed such that said waveguides lie between said coupling strips and said planar electrodes,
   wherein optical signals in said first, second, third and/or fourth waveguides are modulated by a varying voltage potential induced between said planar electrodes and said coupling strips by the incident electromagnetic signal.

2. The photonics sensor according to claim 1,
   wherein said first waveguide lies between said first planar electrode and said first coupling strip and between said second planar electrode and said second coupling strip,
   wherein said second waveguide lies between said fourth planar electrode and said first coupling strip and between said third planar electrode and said second coupling strip,
   wherein said third waveguide lies between said second planar electrode and said third coupling strip and between said third planar electrode and said fourth coupling strip, and
   wherein said fourth waveguide lies between said first planar electrode and said third coupling strip and between said fourth planar electrode and said fourth coupling strip.

3. The photonics sensor according to claim 1, further comprising:
   a first optical source coupled to a first end of each of the first and second waveguides; and
   a second optical source coupled to a first end of each of the third and fourth waveguides.

4. The photonics sensor according to claim 3, further comprising:
   a first output optical waveguide coupled to a second end of each of the first and second waveguides, obverse to the first end; and
   a second output optical waveguide coupled to a second end of each of the third and fourth waveguides, obverse to the first end.

5. The photonics sensor according to claim 4, further comprising:
   a first photodetector coupled to said first output optical waveguide; and
   a second photodetector coupled to said second output optical waveguide.

6. The photonics sensor according to claim 2, further comprising:
   a first bias circuit connected to one of said planar electrodes and one of said coupling strips such as to bias said first or second waveguides to a quadrature or other operating point; and
   a second bias circuit connected to one of said planar electrodes and one of said coupling strips such as to bias said third or fourth waveguides to a quadrature or other operating point.

7. The photonics sensor according to claim 1, wherein photocurrents $i_x$ and $i_y$ are determined as shown:

$$i_x = \sqrt{377 S_i}\, A_R \eta_{opt} P_{opt} \frac{\pi n^3 r_{33} W}{\lambda_{opt}} \frac{S}{h} \frac{1}{\sqrt{1 + \left(\frac{377 \pi f \varepsilon_r \varepsilon_o w S}{h}\right)^2}} \left(\frac{\sin\left(\frac{n\pi W f}{c}\right)}{\frac{n\pi W f}{c}}\right) \sin\theta \quad \text{Equation (1)}$$

$$i_y = \sqrt{377 S_i}\, A_R \eta_{opt} P_{opt} \frac{\pi n^3 r_{33} S}{\lambda_{opt}} \frac{W}{h} \frac{1}{\sqrt{1 + \left(\frac{377 \pi f \varepsilon_r \varepsilon_o w W}{h}\right)^2}} \left(\frac{\sin\left(\frac{n\pi S f}{c}\right)}{\frac{n\pi S f}{c}}\right) \cos\theta \quad \text{Equation (2)}$$

wherein $S_i$ represents incident electromagnetic field power density, $A_R$ represents photodetector responsivity, $\eta_{opt}$ represents optical transmission loss, $P_{opt}$ represents optical power delivered by an optical source, n represents an index of refraction of dielectric layers, $r_{33}$ represents an electro-optic coefficient for Mach-Zehnder waveguides, $\lambda_{opt}$ represents optical source wavelength, S represents an electrode dimension in a y-direction, W represents an electrode dimension in an x-direction, h represents total thickness of dielectric layers, f represents incident electromagnetic field frequency, $\varepsilon_r$ represents a relative dielectric constant of dielectric layers, $\varepsilon_0$ represents permittivity of a vacuum, w represents an overlap of said first planar electrode and said coupling strip, and c is a constant representing speed of light in a vacuum.

* * * * *